United States Patent [19]
Ohoka et al.

[11] Patent Number: 5,632,532
[45] Date of Patent: May 27, 1997

[54] ANTI-SKID CONTROL APPARATUS

[75] Inventors: Masaki Ohoka, Anjou; Toshiya Morikawa, Kariya; Takashi Watanabe, Nagoya, all of Japan

[73] Assignee: Nippondenso Co., Ltd., Kariya, Japan

[21] Appl. No.: 554,628

[22] Filed: Nov. 6, 1995

[30] Foreign Application Priority Data

Dec. 16, 1994  [JP]  Japan ..................... 6-313628

[51] Int. Cl.$^6$ ........................................ B60T 8/48
[52] U.S. Cl. ........................ 303/116.1; 303/119.1
[58] Field of Search ................. 303/113.1, 113.5, 303/116.1, 116.2, 119.1; 364/426.01, 426.02

[56] References Cited

U.S. PATENT DOCUMENTS

| | | | |
|---|---|---|---|
| 4,932,727 | 6/1990 | Wagner et al. | 303/4 X |
| 4,971,400 | 11/1990 | Jonner | 303/116.1 |
| 5,215,358 | 6/1993 | Beilfuss et al. | 303/114.3 |
| 5,234,264 | 8/1993 | Willmann et al. | 303/119.1 X |
| 5,255,963 | 10/1993 | Altmann et al. | 303/116.1 |
| 5,441,336 | 8/1995 | Takeuchi | 303/116.1 |

FOREIGN PATENT DOCUMENTS

| | | |
|---|---|---|
| 49-032494 | 8/1974 | Japan . |
| 61-202965 | 9/1986 | Japan . |
| 93/23271 | 11/1993 | WIPO . |

*Primary Examiner*—Peter M. Poon
*Attorney, Agent, or Firm*—Cushman, Darby & Cushman IP Group of Pillsbury Madison & Sutro LLP

[57] ABSTRACT

An anti-skid control apparatus which can be manufactured at low cost by reducing the number of valves that control the flow of brake fluid has a master cylinder, a first conduit which includes a first branch conduit and a second branch conduit, a cut-off valve, a first control valve installed in the second branch conduit, a second control valve installed in the second branch conduit and connected to a second wheel cylinder, a second conduit connecting the second control valve and a reservoir, a third control valve installed in the second conduit, and a pump connected in parallel with the third control valve. This arrangement permits flexible anti-skid braking operations using a reduced number of components.

22 Claims, 4 Drawing Sheets

ANTI-SKID CONTROL APPARATUS

CROSS-REFERENCE TO RELATED APPLICATION

This application is related to and claims priority from Japanese patent application No. Hei. 6-313628, incorporated herein by reference.

BACKGROUND OF THE INVENTION

1. Field of the Invention

This invention relates to a brake system for automotive vehicles; more specifically, the invention relates to an anti-skid control system that prevents driveability impairment due to wheel locking during a braking operation.

2. Description of the Related Art

In a usual brake system for a vehicle, a master cylinder connected to a brake pedal, a wheel cylinder provided in a brake mechanism for each wheel and a brake fluid reservoir are connected by conduits. An anti-skid control system used in this type of the braking system is described, for example, in Japanese Patent Laid-Open publication No. Sho. 49-32494. In this example, a flow-in valve is installed in a conduit connecting a master cylinder and a wheel cylinder while a flow-out valve is installed in a conduit connecting the wheel cylinder and a reservoir. The brake fluid pressure in the wheel cylinder can be increased and decreased by controlling the flow-in and the flow-out valves. The brake fluid released from the wheel cylinder and reserved in the reservoir is returned to a conduit connecting the master cylinder and the flow-in valve by operation of a pump.

In this type of system, there is a drawback that the system gives a driver an unnatural feeling during the braking operation. This is because the brake pedal is pushed back by the brake fluid when the pressure in the wheel cylinder is decreased (this is commonly known as a "kick-back" phenomenon), or the brake pedal is unnaturally depressed when the brake fluid pressure in the wheel cylinder is increased.

To solve this problem, Japanese Laid-Open Patent publication No. Sho. 61-202965 discloses an anti-skid control system in which the pump is connected to the wheel cylinder to supply the brake fluid thereto during anti-skid operation. Thus, the driver's feeling during the braking operation is improved.

However, in the anti-skid control system shown in the aforementioned document, three control valves to switch the brake fluid on or off are required for a front-right wheel. This means six valves in total are necessary for two front wheels, resulting in a bulky and costly system.

SUMMARY OF THE INVENTION

In view of the above-described problems of the prior art, it is an object of the present invention to provide an anti-skid control apparatus which can be made at lower cost and smaller in size by reducing the number of valves required to control brake fluid flowing therethrough.

To achieve this object, the invention provides an anti-skid control apparatus which has a master cylinder, a first conduit having first and second branch conduits supplying brake fluid from the master cylinder to first and second wheel cylinders, respectively, a cut-off valve between the master cylinder and a junction point of the first and the second branch conduits, a first control valve in the second branch conduit, a second control valve installed between the first control valve and the second wheel cylinder in the second branch conduit, a second conduit extending from between the first and second control valves to a reservoir, a third control valve in the second conduit and a pump connected in parallel with the third control valve.

During normal braking operations, the cut-off valve is open and the brake fluid pressure is transferred to the wheel cylinders. At this stage, the first and the second control valves are open and the third valve is closed. During anti-skid control, the cut-off valve moves to a closed position and the brake fluid pressure from the master cylinder is shut off.

When brake fluid pressure in each wheel cylinder is to be maintained, the first and second control valves are closed, and the third control valve is opened and the brake fluid pumped out from the pump is returned to the reservoir through the third control valve. When the brake fluid pressure in the wheel cylinders is to be decreased during anti-skid control operation, brake fluid in the wheel cylinders is released, the first, second and third valves are all opened, and the brake fluid in the wheel cylinders is returned from the first conduit to the second conduit through the control valves which are all open and held in the reservoir. When the brake fluid is being pumped out from the pump during the pressure decrease stage, the brake fluid from the pump is recirculated to the reservoir through the third control valve.

In addition, it is also possible to control the wheel cylinder pressure so that the pressure in one wheel cylinder is maintained while the pressure in the other wheel cylinder is increased or decreased by controlling the positions of the first, second and third control valves. Further, when different braking forces are required for the wheel cylinders, the brake fluid in the second wheel cylinder can be released to the reservoir through the second and third control valves by closing the first control valve and opening the second and third control valves. The brake fluid pressure in the first wheel cylinder is increased by sending the brake fluid from the master cylinder through the cut-off valve which is opened at the same time.

It is possible that the system also includes a third conduit between a connecting point of the master cylinder and the cut-off valve and the outlet port of the pump, and a one-way valve in the third conduit that releases the brake fluid pumped out from the pump to the master cylinder to prevent any possible damage in the brake fluid passages when the first, second and third control valves are all closed or when the reservoir is filled beyond its capacity with the brake fluid released from the wheel cylinders in a pressure decrease mode.

Further, the system may include two conduits each including a branch one-way valve between the junction point of the first and second branch conduits and a connecting point of the master cylinder and the cut-off valve, and between a connecting point of the second control valve and the second wheel cylinder and the connecting point of the master cylinder and the cut-off valve for returning the brake fluid in the wheel cylinders to the master cylinder when the driver releases the brake pedal.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

The preferred embodiments of the present invention are hereinafter described with reference to the accompanying drawings.

An anti-skid control apparatus according to a first preferred embodiment of the present invention includes a control system for front-right and rear-left wheels and another control system for front-left and rear-right wheels. This type of system is called an X-arrangement. Though FIG. 1 shows only one control system for front-right and rear-left wheels, a similar system can be used for front-left and rear-right wheels.

Figure 1:
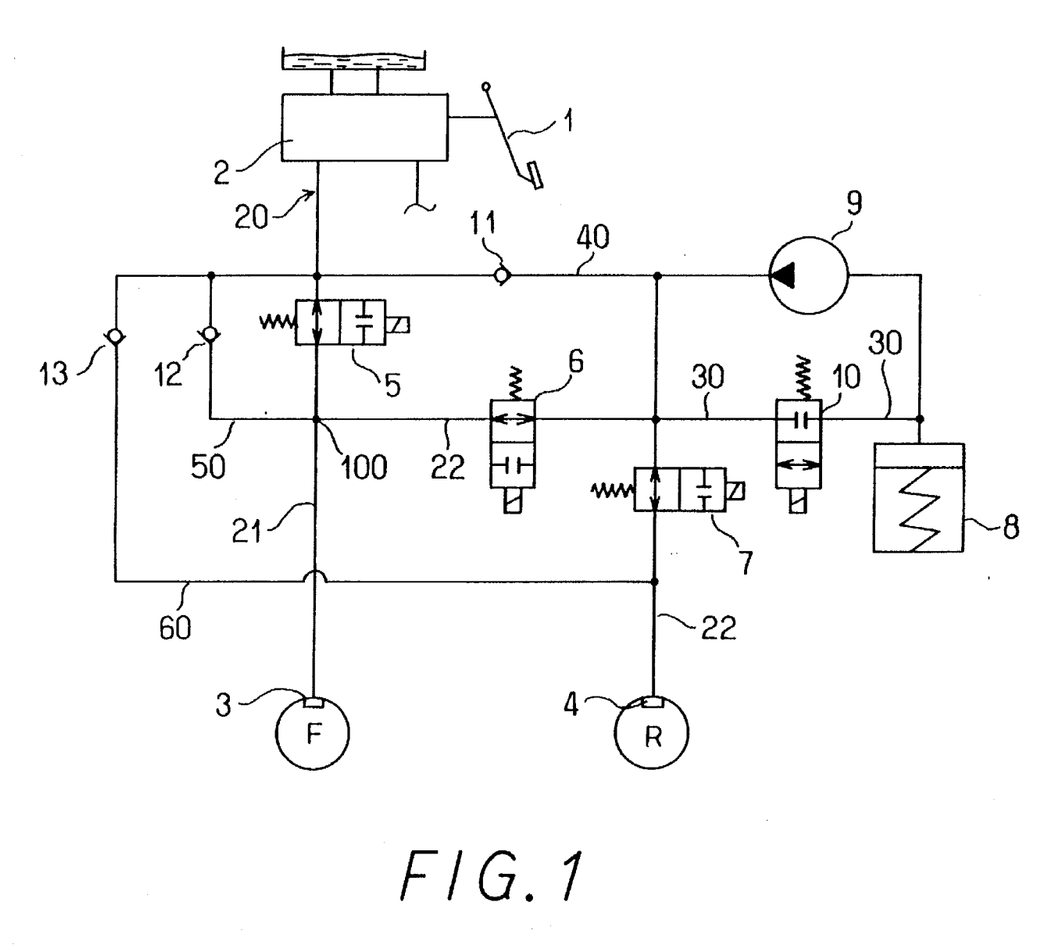
FIG. 1 shows a brake fluid conduit system used in a first preferred embodiment according to the present invention.

In FIG. 1, a brake pedal 1 is connected to a master cylinder 2 which has its own reservoir. The brake fluid pressure generated in the master cylinder 2 by depressing the brake pedal 1 is transferred to the first wheel cylinder 3 for the front-right wheel through a passage described below, thereby applying a braking force to the front-right wheel. In the same manner, the brake fluid pressure in the master cylinder 2 is also transferred to the second wheel cylinder 4 for the rear-left wheel through a passage described below, thereby applying a braking force to the rear-left wheel.

A first conduit 20 extending from an outlet port of the master cylinder 2 branches out at a junction point 100 and is connected to a first branch conduit 21 and a second branch conduit 22. The first branch conduit 21 extends from the junction point 100 and is connected to the first wheel cylinder 3. The second branch conduit 22 extends from the junction point 100 and is connected to the second wheel cylinder 4. In the first conduit 20, a cut-off valve 5 is disposed between the master cylinder 2 and the junction point 100. The cut-off valve 5 controls the brake fluid flow from the master cylinder 2 to the first and second wheel cylinders 3 and 4 by opening or closing the passage therebetween.

A first control valve 6 and a second control valve 7 are installed in the second branch conduit 22 between the junction point 100 and the second wheel cylinder 4 in that order. During anti-skid control operation, the first control valve 6 primarily controls the brake fluid pressure to the first wheel cylinder 3 and the second control valve 7 primarily controls the brake fluid pressure to the second wheel cylinder 4.

A second conduit 30 extends from a point between the first control valve 6 and the second control valve 7 and the other end thereof is connected to a reservoir 8. A third control valve 10 is installed in the second conduit 30. The third control valve 10 controls both the brake fluid flow between the first wheel cylinder 3 and the reservoir 8 and the flow between the second wheel cylinder 4 and the reservoir 8 by opening and closing the passage therebetween. A pump 9 is connected in parallel with the third control valve 10. The pump 9 pumps out the brake fluid stored in the reservoir 8 and discharges it at a point between the first control valve 6 and the second control valve 7 in the second branch conduit 22.

A third conduit 40 extends from the outlet port of the pump 9 and the other end thereof is connected to a point between the master cylinder 2 and the cut-off valve 5 in the first conduit 20. A pump-side one-way valve 11 is installed in the third conduit 40. The pump-side one-way valve 11 permits brake fluid flow only in one direction, from the pump 9 to the master cylinder 2. The third conduit 40 may be connected directly to the master cylinder 2 instead of the point between the master cylinder 2 and the cut-off valve 5.

A fourth conduit 50 extends from the junction point 100 between the cut-off valve 5 and the first wheel cylinder 3, and the other end thereof is connected to the point between the master cylinder 2 and the cut-off valve 5 in the first conduit 20. A first branch one-way valve 12 is installed in the fourth conduit 50. The first branch one-way valve 12 permits brake fluid flow only in one direction, from the first wheel cylinder 3 to the master cylinder 2.

A fifth conduit 60 extends from a point between the second control valve 7 and the second wheel cylinder 4 in the second branch conduit 22, and the other end thereof is connected to the point between the master cylinder 2 and the cut-off valve 5 in the first conduit 20. A second one-way branch valve 13, installed in the fifth conduit 60, permits brake fluid flow only in one direction, from the second wheel cylinder 4 to the master cylinder 2. The fourth conduit 50 and the fifth conduit 60 have a common conduit at the master cylinder 2 side as shown in FIG. 1.

The cut-off valve 5, the first control valve 6, the second control valve 7 and the third control valve 10 each has two ports and two positions (i.e., they are two-port, two-position valves). These two positions are selected in each valve by a solenoid energized by a controller (not shown for simplicity in FIG. 1). When each of the solenoids is not energized, its respective valve takes the position shown in FIG. 1. In place of the electromagnetic valves described here, mechanical valves can also be used.

The first embodiment of this invention described above operates as follows. The valves, i.e., the cut-off valve 5 and the first, second and third control valves 6, 7 and 10, take positions shown in TABLE I below under various modes. Under a normal braking mode as shown in Mode A of TABLE I, the cut-off valve 5 is open, thereby permitting the brake fluid flow from the master cylinder 2 to the wheel cylinders 3 and 4. The first and second control valves 6 and 7 are also open. The brake fluid pressure generated in the master cylinder 2 by depressing the brake pedal 1 is supplied to the wheel cylinders 3 and 4 through valves 5, 6 and 7 which are open.

TABLE I

| Mode | Cyl. 3 Mode | Cyl. 4 Mode | Cut-Off 5 | Ctrl. 1 6 | Ctrl. 2 7 | Ctrl. 3 10 |
| --- | --- | --- | --- | --- | --- | --- |
| A | Normal Braking | | O | O | O | X |
| B | Maintain | Maintain | X | X | X | O |
| C | Maintain | Decrease | X | X | O | O |
| D | Decrease | Maintain | X | O | X | O |
| E | Decrease | Decrease | X | O | O | O |
| F | Increase | Maintain | X | O | X | X |
| G | Maintain | Increase | X | X | O | X |
| H | Increase | Decrease | O | X | O | O |
| I | Reservoir Full | | X | X | X | X |

(O = Open valve, X = Closed valve)

When the wheels are about to be locked, which is detected by sensors (not shown) based on certain relationships between wheel speeds and vehicle speeds, anti-skid control operation will be started to avoid wheel locking and to maintain a slip ratio at an optimal value. During the anti-skid control operation, the brake fluid pressure to be applied to the first and second wheel cylinders 3 and 4 is controlled as shown in Modes B to H in TABLE I. Operations of respective valves, 5, 6, 7 and 10 controlled by a controller (not shown) will be explained below. Normally, the pump 9 starts its operation at the same time as the anti-skid control operation starts, pumps up the brake fluid stored in the reservoir 8, and delivers the brake fluid to the wheel cylinders 3 and 4. However, the pump 9 may not be operated as mentioned above when the vehicle is running on a road having different friction for the right and left wheels or on a curved road. Details will be explained below.

In Mode B, the pressure maintenance mode, in which the brake fluid pressure in the first and second wheel cylinders is maintained, the cut-off valve 5 and the first and second control valves 6 and 7 are all closed while the third control valve 10 is open. The cut-off valve 5 is almost always closed during the anti-skid control operation to cut off the brake fluid pressure from the master cylinder 2. The third control valve 10 is open in this mode, thereby recirculating the brake fluid pumped out from the pump 9 to the reservoir 8. That is, a recirculation passage is formed by the pump 9 and the third control valve 10 connected in parallel, and the brake fluid pumped out from the pump 9 is not accumulated in the fluid passage or in the master cylinder 2. Thus, the maintenance of brake pressure in this system will be safely performed.

Next, the anti-skid operation in a pressure decrease mode shown in Mode E of TABLE I will be explained. In the pressure decrease mode, in which the brake fluid pressure in both of the wheel cylinders 3 and 4 is decreased, the control valves 6, 7 and 10 are all open so that the brake fluid in the first conduit 20 including the first and second branch conduits 21 and 22 is permitted to flow to the second conduit 30. The brake fluid flowing through in the second conduit 30 is stored in the reservoir 8 via the third control valve 10. Although the pump 9 is operated and pumps out the brake fluid in this mode, too, the brake fluid pressure in the wheel cylinders 3 and 4 is decreased because the speed of the pressure release is much faster the speed of the fluid flow pumped out from the pump 9. Thus, the anti-skid control apparatus is operated in a pressure decrease mode when the wheel slip ratio becomes high when, e.g., the wheel is locked, thereby recovering the wheel speed.

The anti-skid control operation in first alternate modes shown in Modes C and D of TABLE I will be explained. In this mode, the brake fluid pressure in either one of the wheel cylinders 3 and 4 is maintained while that in the other one is decreased. As seen from Modes C and D of TABLE I, the third control valve 10 is open in either case. As for the first and second control valves 6 and 7, the valve corresponding to the wheel cylinder in which the pressure is to be maintained is closed and the valve corresponding to the wheel cylinder in which the pressure is to be decreased is open. When the pressure in the first wheel cylinder 3 is to be maintained and the pressure in the second wheel cylinder 4 is to be decreased, the first control valve 6 is closed and the second control valve 7 is open. In the same manner, when the pressure in the first wheel cylinder 3 is to be decreased and the pressure in the second wheel cylinder 4 is to be maintained, then the first control valve 6 is open and the second control valve 7 is closed. The anti-skid control operation in this alternate mode is necessary when road conditions under the right and left wheels are different and the slip ratios or braking conditions of the two wheels are not uniform. In this case, the pressure in each wheel cylinder is controlled differently so that the braking conditions for the right and left wheels are kept optimal.

Now, the anti-skid control operation in the second alternate modes will be discussed. When road conditions under the right and left wheels are not uniform and friction between the wheels and the road is larger, the anti-skid control operation described in Modes F and G in TABLE I may be required. In these second alternate modes, the brake fluid pressure on one of the wheel cylinders 3 and 4 is maintained while that in the other one is increased. As seen in Modes F and G in TABLE I, the third control valve 10 is closed in either case, and the one of the first and second control valves corresponding to the wheel cylinder in which the brake fluid pressure is to be maintained is closed and the other control valve corresponding to the wheel cylinder in which the pressure is to be increased is open. That is, when the pressure in the first wheel cylinder 3 is to be increased and that in the second wheel cylinder 4 is to be maintained, the first control valve 6 is open and the second control valve 7 is closed. When the pressure in the first wheel cylinder 3 is to be maintained and the pressure in the second wheel cylinder 4 is to be increased, the first control valve 6 is closed and the second control valve 7 is open.

As explained above, the first and second wheel cylinders 3 and 4 can be controlled independently because the first and the second control valves 6 and 7 corresponding to the respective wheel cylinders are used and they can be independently controlled.

Next, a third alternate mode shown in Mode H of TABLE I, in which the first wheel cylinder 3 is controlled to increase the pressure therein and the second wheel cylinder 4 is controlled to decrease the pressure therein, will be explained. There may be a case where the right and left wheels run on the road having largely different friction coefficients. In this case, the first and second wheel cylinders 3 and 4 have to be controlled in different modes. For instance, when the road under the right wheels has a high friction coefficient and the road under the left wheels has a low friction coefficient, then it is desirable to obtain a high braking force from the right wheel by applying a larger brake fluid pressure to the first wheel cylinder 3 and to recover the wheel speed of the left wheel by reducing the brake fluid pressure applied to the second wheel cylinder 4. Thus, the optimal slip ratios for both the right and left wheels can be obtained. In addition, it is desirable in a normal braking operation to apply a larger brake fluid pressure to the front wheel cylinders than to the rear wheel cylinders to obtain a larger braking force from the front wheels, because the vehicle weight shifts to the front during a braking operation. The third alternate mode shown in MODE H of TABLE I will be applied to these cases. In this mode, the cut-off valve 5 is open even during the anti-skid control operation and the brake fluid pressure is applied to the first wheel cylinder 3 from the master cylinder 2. Thus, the pressure in the first wheel cylinder 3 is increased and a larger braking force can be obtained corresponding to the higher friction coefficient. The first control valve 6 is closed, thereby shutting off the brake fluid pressure from the master cylinder 2 to the second wheel cylinder 4. The second control valve 7 and the third control valve 10 are opened, thus allowing the brake fluid pressure in the second wheel cylinder 4 to be released and returned to the reservoir 8. The brake fluid pumped out from the pump 9 is also returned to the reservoir 8 through the third control valve 10 which is open. Thus, the pressure in the second wheel cylinder 4 is decreased.

The situation shown in Mode I of TABLE I, where the reservoir 8 is filled up with the brake fluid returned from the wheel cylinders 3 and 4 during the anti-skid operation, will be explained below. When the reservoir 8 is completely filled up with the brake fluid, the pressure in the first and the second wheel cylinders 3 and 4 cannot be released to the reservoir 8. If this happens, the wheel speed cannot be recovered and the slip condition of the vehicle cannot be improved. The control mode in Mode I of TABLE I is used to avoid such a situation. In this mode, the cut-off valve 5 and the control valves 6, 7 and 10 are all closed. The brake fluid pumped out from the reservoir 8 by the pump 9 is returned to the master cylinder 2 through the one-way valve 11 in the third conduit 40 when the pumped out pressure exceeds the master cylinder pressure. Thus, the amount of the brake fluid in the reservoir 8 is reduced and the pressure in the wheel cylinders 3 and 4 can be decreased during the anti-skid control operation.

In addition, some other special control modes which are not shown in TABLE I will be explained. For example, suppose a vehicle is running on a road where the friction coefficient for the right wheels is high and that for the left wheels is low. As another example, suppose a vehicle is turning left on a curved road and the vehicle weight shifts to the right side due to centrifugal force. In these cases, the rear-left wheel tends to be locked easily compared to the front-right wheel, and therefore, a larger braking force is expected to be obtained from the front-right wheel while the wheel speed of the rear-left wheel has to be recovered. For this purpose, a higher brake fluid pressure should be applied to the first wheel cylinder 3 (corresponding to the front-right wheel) and the pressure in the second wheel cylinder 4 (corresponding to the rear-left wheel) should be quickly released. When the rear-left wheel is about to be locked, the first control valve 6 is closed to shut off the brake fluid pressure from the master cylinder 2 to the second wheel cylinder 4 while the pressure to the first wheel cylinder 3 is still supplied from the master cylinder 2 through the open cut-off valve 5. At this point, the pump 9 has not been operated even though the anti-skid operation for the second wheel cylinder 4 has begun because only the pressure decrease in the second wheel cylinder 4 is required. The third control valve 10 is opened upon starting the anti-skid operation for the second wheel cylinder 4. The pressure, having been applied to the second wheel cylinder 4, is released to the reservoir 8 through the second control valve 7 which is open under the normal braking and still open at this moment. Thus, the pressure in the second wheel cylinder 4 is quickly decreased. As soon as the wheel speed of the rear-left wheel is recovered, the third control valve 10 is brought to the closed position and the pressure in the second wheel cylinder 4 is maintained. This can be also attained by closing the second control valve 7. Under this special mode, if the pump 9 is not operated, as mentioned above, the possibility that the reservoir is filled up with the brake fluid released from the second wheel cylinder 4 is not large because the amount of brake fluid supplied to the rear wheel cylinder is usually small compared with that supplied to the front wheel. After the wheel speed of the rear-left wheel has sufficiently recovered, the pressure in the second wheel cylinder 4 can be increased by closing the third control valve 10 and opening the second control valve 7, and thereby supplying the brake fluid intermittently from the master cylinder 2 through the first control valve which is controlled alternately in open and closed positions. In this situation, it is also possible to increase the pressure pumped out from the pump 9 by operating the pump 9. In addition, the pump 9 may be operated after a certain period in which the anti-skid operation has been performed without operating the pump 9. Alternatively, the operation of the pump 9 may be controlled in such a way that the pump 9 starts its operation to pump out the brake fluid from the reservoir 8 after a certain period of pressure decrease operation in the second wheel cylinder 4 which is performed without operating the pump 9. Moreover, the pump 9 may not be operated at all if the anti-skid control operation is required only in a short time due to a quick recovery of the wheel speed as in the case where a vehicle turns on a curved road. Thus, vibration, noise and power consumption associated with the operation of the pump may be minimized.

Next, the operation of the one-way valve 11 will be explained. In the anti-skid control operation mode shown in Mode I of TABLE I, the brake fluid in the reservoir 8 is transferred to the master cylinder 2 by the pumping operation of the pump 9 through the one-way valve 1t in the third conduit 40. Under the anti-skid control operation, the brake fluid in the master cylinder 2 should not flow through the third conduit 40 to the wheel cylinders 3 and 4. If this happens, the anti-skid control operation cannot be performed properly. The one-way valve 11 prohibits brake fluid flow in the third conduit 40 from the master cylinder 2 to the wheel cylinders 3 and 4.

In addition, there may be a situation where the first, second and third control valves 6, 7 and 10 are all closed for a short period due to a time lag for operating the valves after receiving signals from the controller 15. In this situation, if there were no fluid path from the outlet port of the pump 9 to the master cylinder 2, the brake fluid pressure in a closed circuit formed by the control valves 6, 7 and 10 and the outlet port of the pump 9 would be excessively accumulated by the pumping operation of the pump 9. The third conduit 40 with the one-way valve 11 serves as a path to transfer the brake fluid from the pump 9 to the master cylinder 2 when the brake fluid pressure at the outlet port of the pump 9 exceeds the master cylinder pressure, thereby preventing any possible damage in the circuit.

The operation of the first branch one-way valve 12 and the second branch one-way valve 13 will be explained below. As mentioned above, the first and second branch one-way valves 12 and 13 are installed in the fourth conduit 50 and the fifth conduit 60, respectively. When the brake pedal 1 is depressed hard and the wheels are about to be locked, the anti-skid control operation will be started. When a driver releases the brake pedal 1 during the anti-skid control operation, that is, when the cut-off valve 5 is closed, the braking force applied to the wheel cylinders 3 and 4 should be released according to the driver's intention. If the braking force applied to the wheel cylinders 3 and 4 continues to increase under the anti-skid control operation even when the driver releases the brake pedal 1, the driver would have an unnatural feeling. To eliminate this problem, the brake fluid pressure in the wheel cylinders 3 and 4 has to be decreased in accordance with the pressure decrease in the master cylinder 2 caused by releasing the brake pedal 1 by the driver. To decrease the pressure in the wheel cylinders 3 and 4 in accordance with the pressure decrease in the master cylinder 2, the fourth conduit 50 and the fifth conduit 60 are provided for the respective wheel cylinder 3 and 4. The driver can feel the brake pedal return caused by the brake fluid returning to the master cylinder 2 from the wheel cylinders 3 and 4 through the fourth and the fifth conduit 50 and 60. The first and second branch one-way valves 12 and 13 permit brake fluid flow in only one direction from the wheel cylinders 3 and 4 to the master cylinder 2. Therefore, the brake fluid in the master cylinder 2 does not flow to the wheel cylinders 3 and 4 through the fourth and fifth conduits 50 and 60 when the brake pedal is being depressed by the driver during the anti-skid control operation. The fourth conduit 50 and the fifth conduit 60 are connected to their respective wheel cylinders 3 and 4. Therefore, brake fluid flow between the first wheel cylinder 3 and the second wheel cylinder 4 is not permitted. If brake fluid flow between the wheel cylinders 3 and 4 were permitted, the independent control of the brake fluid pressure in the first and second wheel cylinders 3 and 4 by the respective control valves 6 and 7 would not be possible.

Merits and advantages of the first embodiment are explained below. The number of valves required to independently control the first wheel cylinder 3 and the second wheel cylinder 4 is only four in this embodiment. That is, only the control valves 6, 7 and 10 and the cut-off valve 5 are required in this embodiment. In the conventional high performance anti-skid control system to independently control each wheel cylinder, more valves have been required than in the present invention. In the first embodiment of the invention, the first control valve 6 and the second control valve 7 control the pressure in the respective wheel cylinders 3 and 4 in the three modes, i.e., pressure increase, decrease and maintaining. The independent pressure increase and decrease in the wheel cylinders 3 and 4 can be managed by the cut-off valve 5 and the third control valve 10 as mentioned above. Therefore, an anti-skid control apparatus which can be manufactured at low cost and with a small size is realized according to this invention. In addition, the driver's feeling in the braking operation is also improved.

By installing the first control valve 6 which controls the first wheel cylinder 3 in the second conduit 22 instead of the first conduit 21, the brake fluid pressure in the first wheel cylinder 3 (corresponding to the front-right wheel) can be increased while the pressure in the second wheel cylinder 4 (corresponding to the rear-left wheel) is being decreased as explained using Mode H of TABLE I. In a conventional apparatus, the pressure in a wheel cylinder cannot be increased while the pressure in the other wheel cylinder is being decreased in a single system including two wheel cylinders. The pressure in a wheel cylinder can be controlled only to maintain the pressure which has been applied while the pressure in the other wheel cylinder is being decreased. Conventionally, it is necessary to use a greater number of valves in order to attain independent pressure control in the increase and decrease modes for the respective wheel cylinders as is done in this invention. Therefore, the whole apparatus necessarily becomes complex. According to this invention, however, the independent control of the wheel cylinder pressure in both increase and decrease modes can be performed using a small number of valves. When the first embodiment is used in an X-arrangement, where one system includes a control apparatus for a front-right wheel and a rear-left wheel and another apparatus is used for a front-left wheel and a rear-right wheel, the front wheels can be controlled in the pressure increase mode while the rear wheels are controlled in the pressure decrease mode, the control of which is required when the vehicle runs on a road having different friction coefficients for the right and left wheels. This invention, therefore, can provide a high performance anti-skid control apparatus which performs excellent vehicle control operations in response to various road conditions.

In addition, the pump 9 is not required to have a high output to overcome the pressure from the master cylinder 2 during the anti-skid control operation, because the brake fluid pressure from the master cylinder 2 is shut off by the cut-off valve 5 when the anti-skid control operation starts. This also contributes to making the whole apparatus compact and inexpensive.

Figure 2:
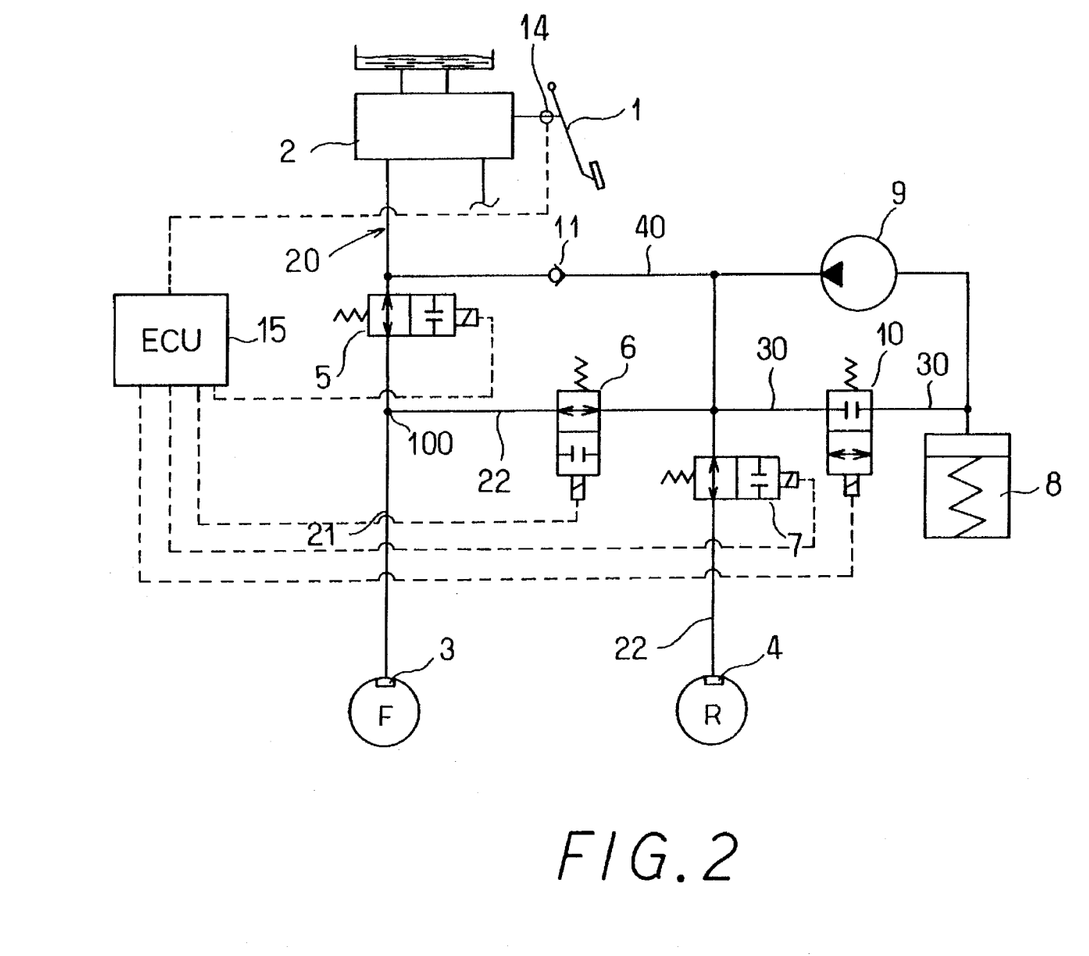
FIG. 2 shows a brake fluid conduit system used in a second preferred embodiment according to the present invention.

This invention can also be realized in other embodiments. For example, the second embodiment shown in FIG. 2 is a system for controlling a front-right wheel and a rear-left wheel as in FIG. 1. Combining the two systems, a so called X-arrangement is obtained. In the second embodiment, the fourth conduit 50 with the first one-way valve 12 and the fifth conduit 60 with the second one-way valve 13 are eliminated from the first embodiment shown in FIG. 1. That is, the second embodiment does not have the brake fluid return paths from the wheel cylinders 3 and 4 to the master cylinder 2 when a driver releases the brake pedal during the anti-skid control operation (i.e., cut-off valve 5 is closed). In this embodiment, a sensor system 14 connected to ECU 15 for detecting whether a driver releases the brake pedal can play a role to control the valves, and the brake fluid in the wheel cylinders 3 and 4 can be returned to the master cylinder 2 through the cut-off valve 5, the first control valve 6 and the second control valve 7 which are all brought to the open position when the sensor detects that the driver has released the brake pedal. Thus, the second embodiment can perform the same function as the first embodiment which has the fourth and fifth conduits 50 and 60.

Figure 3:
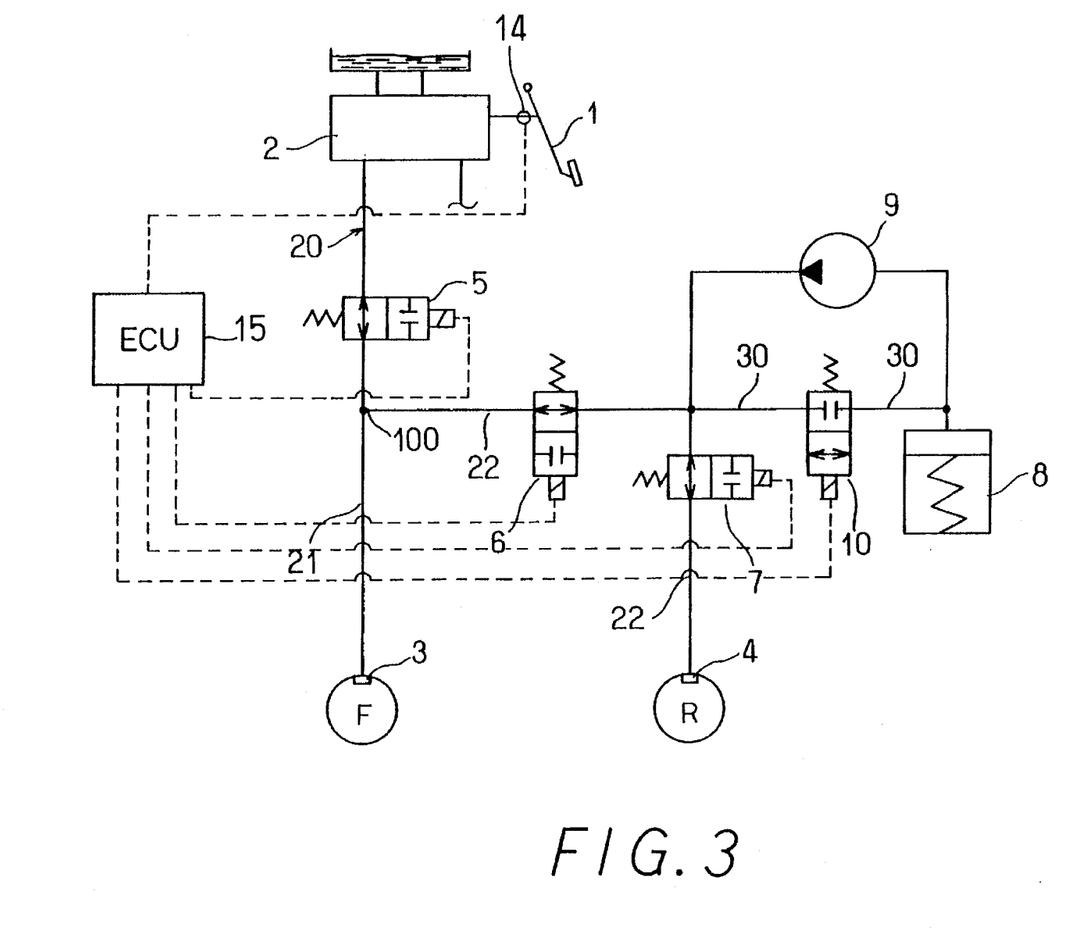
FIG. 3 shows a brake fluid conduit system used in a third preferred embodiment according to the present invention.

A third embodiment as shown in FIG. 3 has the third conduit 40 with the one-way valve 11 further eliminated from the second embodiment shown in FIG. 2. The function performed by the third conduit 40 with the one-way valve 11 is to return the brake fluid to the master cylinder 2 to avoid an over-pressure condition in the circuit when the reservoir 8 is fully filled and the control valves 6, 7 and 10 are all closed. In the third embodiment, the capacity of the reservoir S is made large enough so that the reservoir 8 is never fully filled with brake fluid, and further the closed circuit encircled by control valves 6, 7 and 10 and the outlet port of the pump 9 is made strong enough to endure the pressure accumulated therein when all of these valves are closed. Thus, the third embodiment without the third conduit 40 can be operated in the same manner as in the first embodiment.

Figure 4:
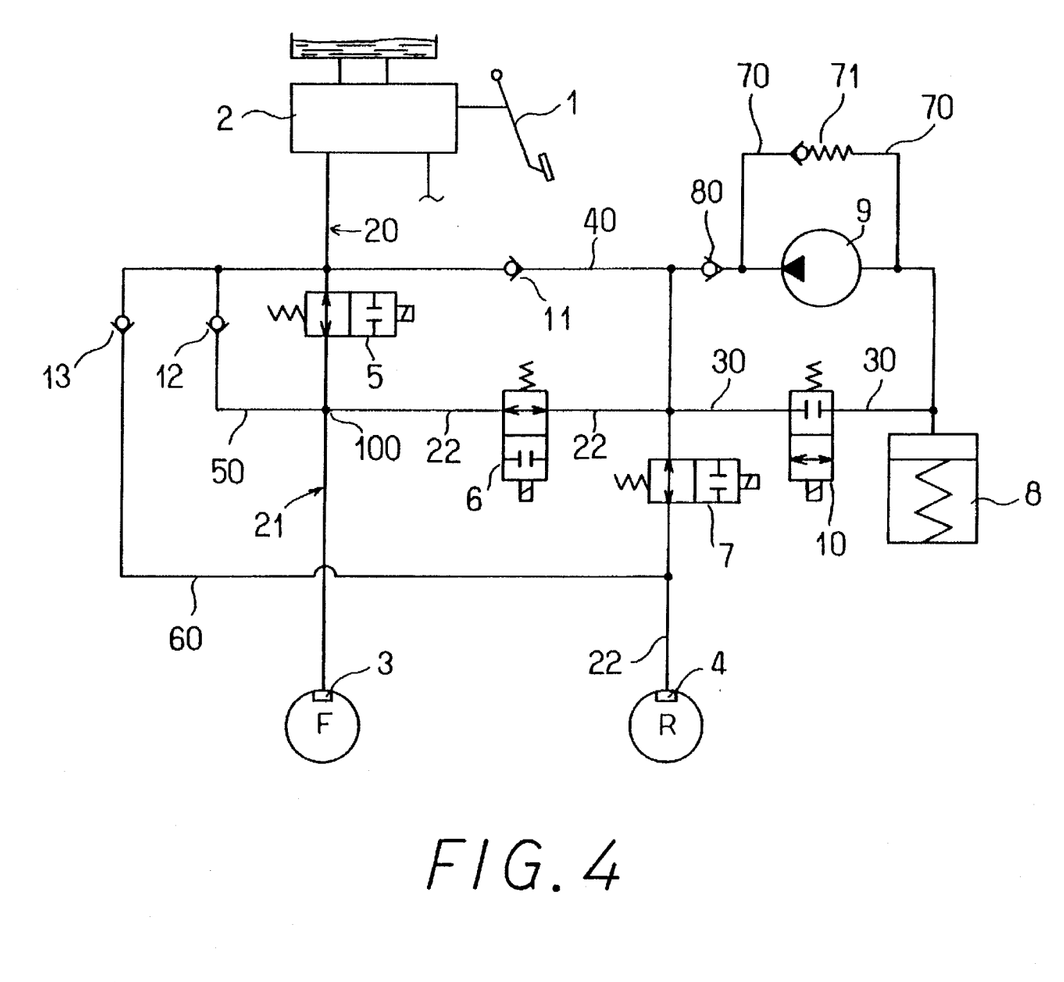
FIG. 4 shows a brake fluid conduit system used in a fourth preferred embodiment according to the present invention.

The fourth embodiment shown in FIG. 4 is another example of possible modifications to the first embodiment. In the fourth embodiment, a sixth conduit 70 is additionally connected in parallel with the pump 9 and a relief valve 71 is installed in the sixth conduit 70. The relief valve 71 permits the brake fluid to flow only in one direction from the outlet port to the inlet port of the pump 9 when the brake fluid pressure at the outlet port exceeds a predetermined value. The predetermined value may be set to a value which is nearly equal to the maximum value of the outlet pressure of the pump 9. If the predetermined value of the relief valve 71 is thus set, the brake fluid returns from the outlet port to the inlet port of the pump 9 through the relief valve 71 in the sixth conduit 70 in case the pressure at the outlet port of the pump 9 reaches the maximum outlet pressure. In other words, the brake fluid pressure in the closed circuit encircled by the control valves 6, 7 and 10 and the outlet port of the pump never exceeds the preset pressure of the relief valve 71. Thus, the closed circuit is protected from over-pressure conditions and the safety of the whole apparatus is further enhanced. In case the maximum pressure generated in the master cylinder 2 exceeds the preset pressure of the relief valve 71, a check valve 80 that does not allow brake fluid flow from the master cylinder 2 to the pump 9 and which allows flow from the pump 9 to the master cylinder 2 is preferably installed at the position shown in FIG. 4, so that only the brake fluid pumped out from the pump 9 is recirculated through the relief valve 71. In addition, the third conduit 40 in FIG. 4 can be eliminated.

Although-the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An anti-skid control apparatus comprising:
   a master cylinder for generating brake fluid pressure;
   a first conduit having first and second branch conduits for supplying said brake fluid pressure from said master cylinder to a first wheel cylinder and a second wheel cylinder;
   a cut-off valve between said master cylinder and a junction point of said first and second branch conduits, for selectively supplying and cutting off brake fluid from said master cylinder;
   a first control valve in said second branch conduit for controlling brake fluid flow in said second branch conduit;
   a second control valve between said first control valve and said second wheel cylinder in said second branch conduit for controlling brake fluid flow in said second branch conduit;
   a second conduit extending from a point between said first control valve and said second control valve to a reservoir;
   a third control valve in said second conduit for controlling brake fluid flow in said second conduit;
   a pump in parallel with said third control valve for pumping up brake fluid from said reservoir and supplying said pumped up brake fluid to said first and second wheel cylinders.

2. The apparatus of claim 1, wherein brake fluid is permitted to recirculate from an outlet port of said pump to said reservoir through said third control valve when said third control valve is open and said cut-off valve and said first and second control valves are all closed.

3. The apparatus of claim 1, further comprising:
   a third conduit between a connecting point of said master cylinder and said cut-off valve, and an outlet port of said pump; and
   a one-way valve in said third conduit, allowing brake fluid to flow therethrough only in a direction from said outlet port of said pump to said master cylinder.

4. The apparatus of claim 3, wherein brake fluid is permitted to recirculate from said outlet port of said pump to said reservoir through said third control valve when said third control valve is open and said cut-off valve and said first and second control valves are all closed.

5. The apparatus of claim 1, further comprising:
   a third conduit between a junction point of said first and second branch conduits, and a connecting point of said master cylinder and said cut-off valve;
   a fourth conduit between a connecting point of said second control valve and said second wheel cylinder, and said connecting point of said master cylinder and said cut-off valve;
   a first one-way valve in said third conduit, allowing brake fluid to flow only in a direction from said first wheel cylinder to said master cylinder; and
   a second one-way valve in said fourth conduit, allowing brake fluid to flow only in a direction from said second wheel cylinder to said master cylinder.

6. The apparatus of claim 5, wherein brake fluid is permitted to recirculate from an outlet port of said pump to said reservoir through said third control valve when said third control valve is open and said cut-off valve and said first and second control valves are all closed.

7. The apparatus of claim 5, wherein a portion of said third and fourth conduits extending from said first and second one-way valves, respectively, to said connecting point of said master cylinder and said cut-off valve is a common conduit.

8. The apparatus of claim 7, wherein brake fluid is permitted to recirculate from an outlet port of said pump to said reservoir through said third control valve when said third control valve is open and said cut-off valve and said first and second control valves are all closed.

9. The apparatus of claim 1, further comprising:
   a third conduit one end of which is connected in a closed circuit formed by said first, second and third control valves and an outlet port of said pump and another end of which is connected in a closed circuit formed by said reservoir and an inlet port of said pump; and
   a relief valve in said third conduit, permitting brake fluid to flow from said outlet port of said pump to said inlet port of said pump when brake fluid pressure at said outlet port of said pump exceeds a predetermined value.

10. The apparatus of claim 9, wherein brake fluid is permitted to recirculate from said outlet port of said pump to said reservoir through said third control valve when said third control valve is open and said cut-off valve and said first and second control valves are all closed.

11. The apparatus of claim 1, wherein portions of conduits proximate to a junction of said point between said first and second control valves contain said brake fluid pressure when said first, second and third control valves are closed.

12. The apparatus of claim 1, further comprising control means for controlling said cutoff valve and said first, second and third control valves.

13. The apparatus of claim 12, further comprising:
   a brake pedal connected to said master cylinder, said master cylinder for generating brake fluid pressure responsive to depression of said brake pedal; and
   a sensor for detecting a release of said brake pedal;
   wherein said control means is further for opening said cutoff valve and said first and second control valves to release pressure from said first and second wheel cylinders to said master cylinder.

14. The apparatus of claim 12, wherein said control means is further for beginning operation of said pump a predetermined amount of time after starting an anti-skid braking operation.

15. The apparatus of claim 12, wherein said control means is further for beginning operation of said pump a predetermined amount of time after beginning a pressure decrease operation in one of said wheel cylinders.

16. A method of performing anti-skid brake control, said method comprising the steps of:
   establishing a master-wheel brake fluid flow path from a master cylinder to one of first and second wheel cylinders, using a cutoff valve disposed in a first conduit connected to said master cylinder and having first and second branch conduits each connected to a respective one of said first and second wheel cylinders and a first control valve disposed in said second branch conduit, each in an open state, said cutoff valve being between said master cylinder and a junction point of said first and second branch conduits;
   maintaining pressure in said first wheel cylinder by closing said cutoff valve and said first control valve;

maintaining pressure in said second wheel cylinder by closing a second control valve disposed in said second branch conduit between said first control valve and said second wheel cylinder;

establishing a cylinder-reservoir flow path to reduce pressure in one of said wheel cylinders by opening a third control valve disposed in a second conduit connecting a point on said second branch conduit between said first and second control valves and a reservoir; and establishing a pump-cylinder flow path using a pump connected to a third conduit in parallel with said third control valve to increase pressure in one of said wheel cylinders by closing said third control valve.

17. The method of claim 16, wherein said cylinder-reservoir flow path establishing step comprises a step of closing said cutoff valve and opening said first control valve to establish a flow path between said first wheel cylinder and said reservoir.

18. The method of claim 16, wherein said cylinder-reservoir flow path establishing step comprises a step of closing said first control valve and opening said second control valve to establish a flow path between said second wheel cylinder and said reservoir.

19. The method of claim 16, wherein said pump-cylinder flow path establishing step comprises a step of opening said first control valve to establish a flow path between said pump and said first wheel cylinder.

20. The method of claim 16, wherein said pump-cylinder flow path establishing step comprises a step of opening said second control valve to establish a flow path between said pump and said second wheel cylinder.

21. The method of claim 16, further comprising a step of establishing a pump-master flow path using a one-way valve between said pump and said master cylinder.

22. The method of claim 16, further comprising a step of establishing a cylinder-master flow path from one of said wheel cylinders to said master cylinder using a one-way valve.

* * * * *